(No Model.) 3 Sheets—Sheet 1.

D. NOBLE.
PORTABLE PUMPING APPARATUS.

No. 491,186. Patented Feb. 7, 1893.

Witnesses:
J. B. McGirr.
Richard H. Dyer.

Inventor.
Donald Noble,
By Seans L. Dyer atty.

(No Model.) 3 Sheets—Sheet 2.

D. NOBLE.
PORTABLE PUMPING APPARATUS.

No. 491,186. Patented Feb. 7, 1893.

Witnesses:
J. B. McGive
Armand H. Dyer

Inventor:
Donald Noble
By Frank L. Dyer, atty (No Model.) 3 Sheets—Sheet 3.

D. NOBLE.
PORTABLE PUMPING APPARATUS.

No. 491,186. Patented Feb. 7, 1893.

Witnesses:
JB McGirr.
Armand H. Dyer

Inventor:
Donald Noble
By Frank L. Ayer attys.

UNITED STATES PATENT OFFICE.

DONALD NOBLE, OF LEEDS, ENGLAND.

PORTABLE PUMPING APPARATUS.

SPECIFICATION forming part of Letters Patent No. 491,186, dated February 7, 1893.

Application filed March 8, 1892. Serial No. 424,219. (No model.) Patented in England July 25, 1889, No. 11,830, and in Victoria May 30, 1890, No. 7,762.

*To all whom it may concern:*

Be it known that I, DONALD NOBLE, a subject of the Queen of Great Britain, residing at Leeds, in the county of York, England, have invented new and useful Improvements in Portable Pumping Apparatus, (for which I have obtained patents in Great Britain, No. 11,830, dated July 25, 1889, and in Victoria, No. 7,762, dated May 30, 1890,) of which the following is a specification.

This invention relates to improvements in means or apparatus for use in connection with baths or trays that may be readily removed from one room or place to another as well as used with baths that are a fixture.

The invention is also applicable for washing or bathing horses, dogs, or other animals, carriages, windows, watering or sprinkling flowers, plants, and other similar purposes, when water is required to be pumped or raised prior to being ejected onto a bather, animal or any other object or thing operated upon. And its object is to provide a light cheap, simple, effective and portable single or double acting pumping apparatus capable of being worked by the heels of one foot or both feet of the operator, for raising the water from a bucket receptacle or other supply on to the operator or any other object or thing operated upon, and at the same time permitting of the operator having the free use of both hands (when working the apparatus with the feet) for washing purposes, or by directing or controlling the supply of water.

Like parts in all the views are marked with similar letters of reference.

Figure 2:
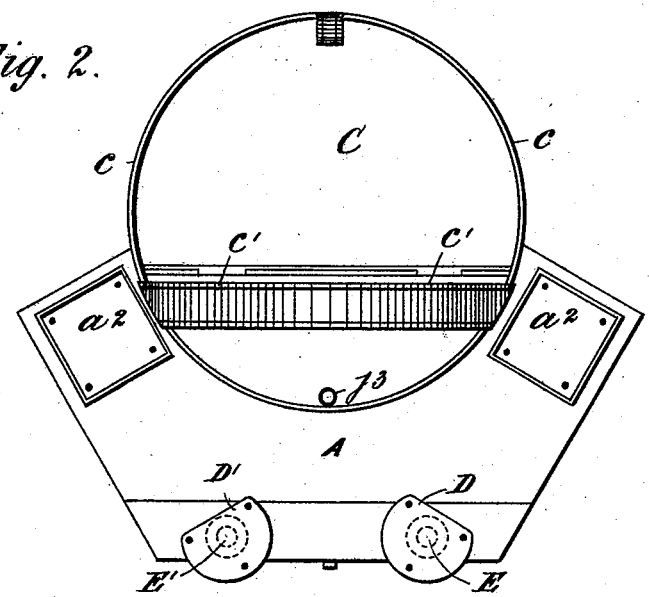
Figure 1:
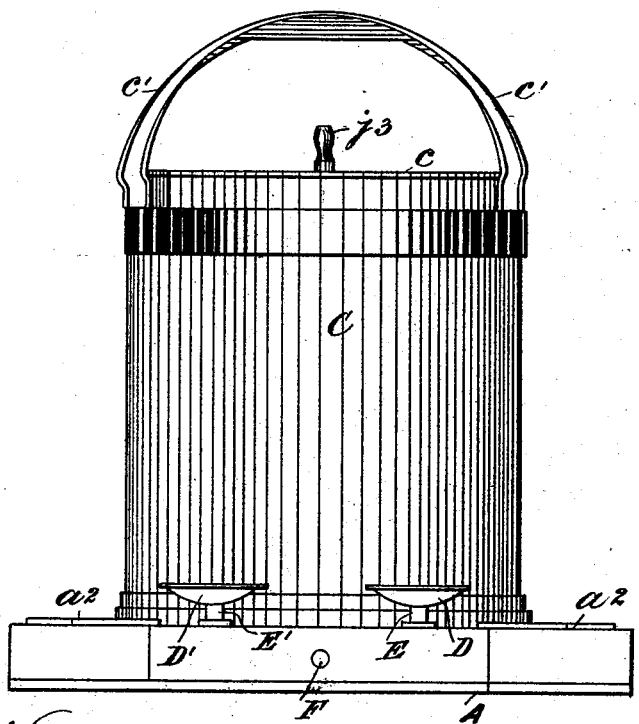
Figure 4:
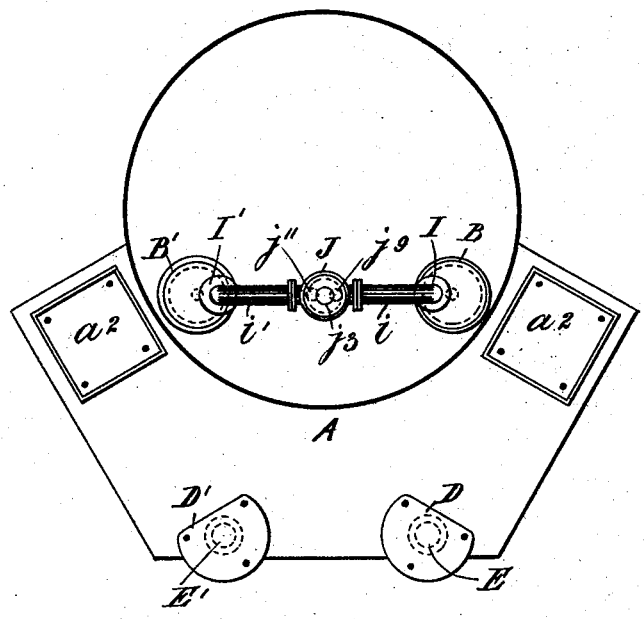
Figure 3:
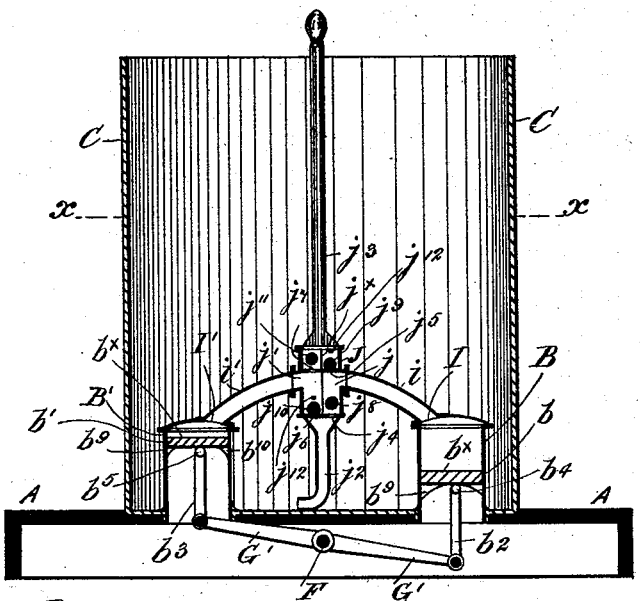
Figure 6:
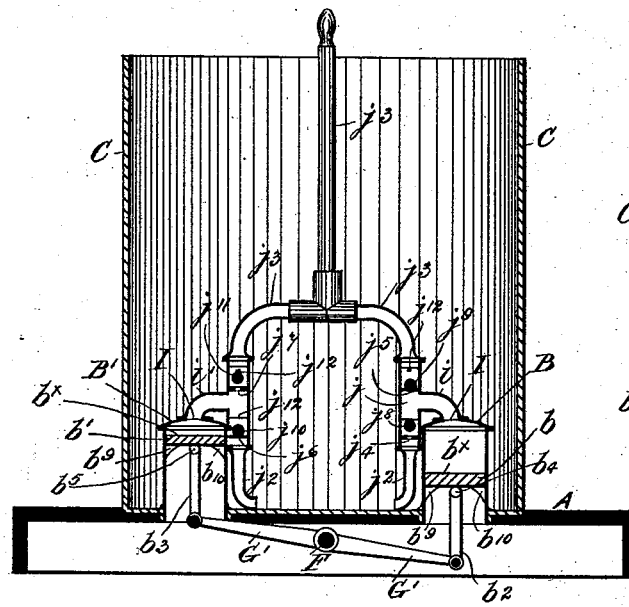
Figure 7:
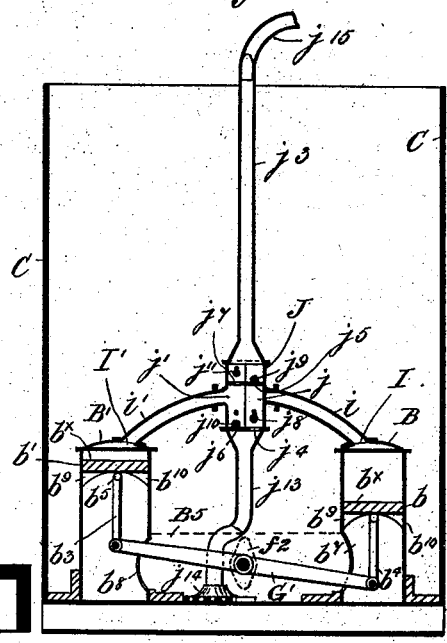
Figure 5:
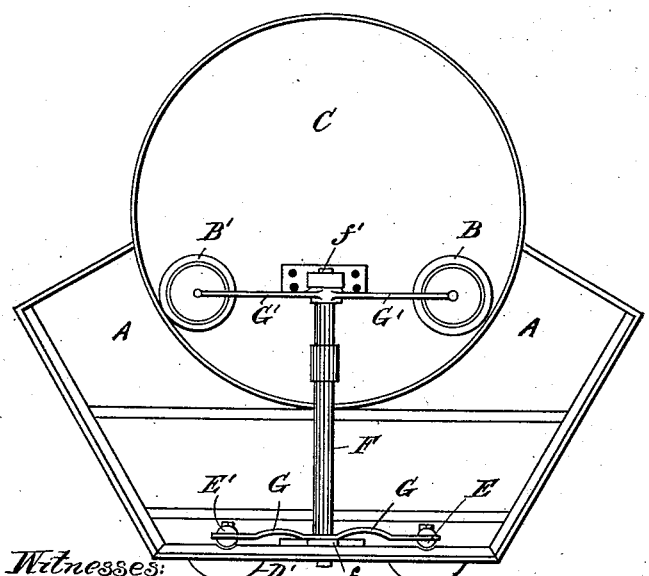

Figure 1, an elevation, Fig. 2 a plan—looking at the top, Fig. 3, a sectional elevation, Fig. 4, a sectional plan on line $xx$ Fig. 3. Fig. 5 a plan looking at the bottom and Fig. 6 a sectional elevation all showing pumping apparatus constructed according to this invention combined with a receptacle for containing the water to be raised or ejected. Fig. 7 a sectional elevation showing a method of arranging the ball valves of a pumping apparatus.

A is a raised platform framing or casing (hereinafter termed the platform) on which the operator stands, of any suitable size, height, and shape preferably though not necessarily so, constructed of light metal such as sheet iron, brass, zinc, or the like, or of metal and wood combined of about one and a half or more inches in height.

The platform A may be fixed or attached to a bucket or other receptacle (for receiving the water) containing the pumping apparatus as shown. To the top of the platform may also be fixed pieces of cork, wood or other material at $a^2$, $a^2$ (attached thereto by cement, rivets, screws, or other suitable means) on which the toes or forepart of the operator's foot or feet rest during the pumping operation. The pumping apparatus I prefer to employ may consist of two vertical cylinders or tubes B. B' provided with water-tight pistons $b$ $b'$ mounted within a water receptacle such as C. provided with or without a lid $c$ and handle $c'$. The required reciprocating motion is imparted to the pistons $b$ $b'$, from the operator's feet as he stands upon platform A (attached to the water receptacle or bucket C) through fixed or removable pedals D D', spindles E E', shaft F mounted in bearings $f, f'$ respectively formed in and attached to the sides of and below the top of the platform A and to the underside of the bottom of the water receptacle C, rocking levers G G' mounted on shaft F and connected at their respective ends to the spindles E, E' and piston rods $b^2$, $b^3$ which are fixed or coupled or jointed at $b^4$ $b^5$ to the under surfaces of the pistons as shown (that is the ends of lever G are connected to spindles E, E' and the ends of lever G' to the piston rods $b^2$ $b^3$.)

When the shaft F is mounted in and above the bottom of a water receptacle C such as shown at Fig. 7 it will be found necessary to carry one end thereof in a watertight stuffing box or gland $f^2$, and also to provide openings $b^7$ $b^8$ in the cylinders B. B' below the undersurface of each piston shown at Fig. 7. to permit of the ends of the lever G', passing to the piston rods. The openings $b^7$ $b^8$ are arranged in their respective cylinders beyond the outer portion or thickness of each piston when at its extreme outward stroke to prevent any water entering into the waterspace (within each cylinder) except through the orifice I. I', and also for the same purpose the rocking lever G', may when preferred be arranged to work within an inverted trough or ⋂ shaped casing B⁵ the top of which is shown by dotted lines at Fig. 7.

It will readily be understood on reference to the drawings that the inner surface $b^x$ of each of the pistons $b\ b'$ act as an end or boundary of the water space in that portion of the cylinder in which the piston works and according to the amount of stroke imparted to it by the means described will the size of the water compartment in each cylinder be increased or diminished, that is to say the shorter the stroke of the piston, the nearer it will be to the top or bottom of the cylinder and consequently there will be a smaller water space than when a longer stroke is imparted or provided for. In order to insure the pistons working evenly, projecting pieces or rings $b^9$ $b^{10}$, may be attached to the under surface of each piston in such a manner as to act as guides or steadying pieces.

When the vertical cylinders B B' are mounted directly upon or within the platform A the orifices or openings I. I' (for the admission of water) into each cylinder or reservoir may be arranged at or near its bottom but when it is preferred to use the pumping apparatus within a water receptacle or bucket—C. as shown in drawings then it may be found advantageous to have it arranged at the top of the cylinders as shown at Figs. 5 to 7. Each of the orifices I and I' is connected by a suitable tube $i\ i'$ (preferably though not necessarily so made of brass) with a chamber J divided by a vertical plate $j^x$ into two compartments or tubes $j.\ j'$ or separate tubes $j.\ j'$ each provided with an inlet and outlet may be cast in or on or fixed to the cylinders as shown at Fig. 7. When a chamber J is employed it is provided with a central inlet pipe $j^2$ and outlet pipe $j^3$ common to or communicating with both of the compartments.

In each tube or compartment $j, j'$ are provided two valve seats $j^4$, $j^5$. and $j^6\ j^7$ for the reception of the india rubber or other suitable ball valves $j^8\ j^9$, and $j^{10}\ j^{11}$ and a piece of wire perforated zinc or other suitable material may be fixed on each face or compartment at or about $j^{12}$ to prevent the valves from rising too high. The communication between cylinders B. B' and tubes or compartments $j\ j'$ is made midway between each pair of valve seats as shown that is tube $i$ is connected with tube or compartment $j$ about midway between the valves $j^8$ and $j^9$ and tube $i'$ about midway between the valves $j^{10}$ and $j^{11}$. To the central piece $j^2$ may be attached a piece of flexible or other tubing or the pipe $j^2$ may be prolonged and armed when required with an ordinary nozzle or suction piece $j^{14}$ as shown at Fig. 7. While to the outlet pipe $j^3$ may be fixed a piece of flexible tubing $j^{15}$ armed with an ordinary rose, or brush and rose combined or one of the ends of the flexible tube may be attached to one or more pieces of rigid tubes of a suitable size, shape and length placed side by side and soldered or otherwise fastened together or mounted in a bamboo cane or handle and armed when preferred with one or more nozzles, roses, brushes and jets.

When the apparatus is used for bathing or washing the human body, or a dog or other animal the outlet end of the tube (flexible or rigid) may be armed with a rose around which may be mounted a row or outer edging of bristles, india rubber, flannel Egyptian loofah, or other suitable material so as to permit of a constant supply of water being delivered on to the body or other object operated upon within the row of bristles or other material while the latter are employed for aiding in loosening, or rubbing or scouring off the dirt or other impurities. But when the apparatus is used for carriage or window cleaning or the like purposes then I prefer to arm the outlet end with a brush and rose or with a brush rose and jet. For watering gardens, flowers, plants and like purposes the outlet end of the flexible tube may when preferred either be connected with a similar arrangement of two pipes provided with a jet and round rose in place of brush and rose or it may be armed with two round roses (placed at right angles to each other) and a jet. The end of the inlet tube $j^{13}$ or $j^2$ armed when preferred with a nozzle or suction piece may be placed in an ordinary bucket or receptacle such as C containing hot or cold water, and when the pedal D' is depressed by one of the operator's feet the other pedal D will rise. At the same time water will be drawn out of the bucket or other receptacle such as C through the inlet tube into compartment $j$ (lower valve $j^8$ being then opened and upper valve $j^9$ closed) and from thence into cylinder B. (to which the pedal D' is attached) by the vacuum formed therein. While the pedal D' is descending for raising piston $b'$ the lower valve $j^{10}$ in tube or compartment $j'$ will be closed, upper valve $j$ opened and any water already in the cylinder forced up through the vertical tube and outlet pipe $j^3$. and flexible tube $j^{15}$, and its armature or connections on to the bather or other animals, object or thing. A similar motion is obtained when the pedal D' is depressed only the action of the valves is reversed.

When the above described pumping apparatus is employed for bathing or washing the human body it may be used with an ordinary bath or tray so placed in a collapsible india rubber tray similar to that herein described and when the bathing operation is completed the bath or tray may be emptied (while the bather is drying himself) by reversing the position of tubes $j^2$ and $j^3$ that is converting outlet tube $j^3$ into the inlet and tube $j^2$, into the outlet. But when the pumping apparatus is used for washing or bathing horses, dogs or other animals, carriages, windows, watering or sprinkling gardens or like purposes, I find it advantageous to place it within a receptacle such as C. which also contains the water whereby the pumping apparatus and its water supply may be readily removed from one place to another.

In the above arrangements of apparatus I have shown and described the cylinders as being provided with single pistons, but when preferred each cylinder may have two pistons connected and operating together in a similar manner as herein described and two water spaces or compartments. In this case each cylinder is provided with an orifice at its top and bottom ends, and the tubes or pipes respectively connecting each bottom orifice with the central chamber will cross each other in a diagonal direction and form a junction with tubes or pipes respectively between the chamber and the cylinder. By this means a double amount of water may be ejected by the same length of stroke of the pistons and depression of the pedals.

Having now particularly described and ascertained the nature of my said invention and in what manner the same is to be performed, I declare that what I claim is:—

In portable pumping apparatus worked by the heels of the operator's feet, the combination of the bi-partite cylinders and pistons with pedals D. D' levers G, G' shaft F fitted revolvingly to platform A. and connections $b^2$, $b^3$. E, E' as set forth.

In testimony whereof I have hereunto signed my name to this specification in presence of two subscribing witnesses.

DONALD NOBLE.

Witnesses:
W. FAIRBORN HART,
ADAM L. HART.